United States Patent [19]

Smith

[11] 4,100,266
[45] Jul. 11, 1978

[54] CONTROL SYSTEM FOR A SULFUR PROCESS

[75] Inventor: Dexter E. Smith, Bartlesville, Okla.

[73] Assignee: Phillips Petroleum Company, Bartlesville, Okla.

[21] Appl. No.: 838,029

[22] Filed: Sep. 29, 1977

[51] Int. Cl.² .......................... C01B 17/04; G01N 7/00
[52] U.S. Cl. .......................... 423/574 R; 423/DIG. 5; 23/253 A; 23/255 R
[58] Field of Search ......... 423/573, 574, 576, DIG. 5; 23/253 A, 255 R

[56] References Cited

U.S. PATENT DOCUMENTS

| 3,026,184 | 3/1962 | Karaser | 423/573 X |
|---|---|---|---|
| 3,312,529 | 4/1967 | Evano | 23/255 |
| 3,871,831 | 3/1975 | Andral et al. | 423/573 X |
| 4,021,201 | 5/1977 | Vautrain et al. | 23/253 A |

FOREIGN PATENT DOCUMENTS 905,365  9/1962  United Kingdom ................ 423/574

*Primary Examiner*—G. O. Peters

[57] ABSTRACT

Control of a process for producing free sulfur from hydrogen sulfide is accomplished by manipulating the flow rate of a feed stream containing oxygen to a furnace in such a manner that a desired proportion of the hydrogen sulfide fed to the furnace is converted to sulfur dioxide. The flow rate of a feed stream containing hydrogen sulfide to a tail gas cleanup process is also manipulated utilizing feedforward and feedback control to maintain the hydrogen sulfide and sulfur dioxide concentrations in the gas stream from the tail gas cleanup process at acceptable levels to avoid environmental polution.

25 Claims, 3 Drawing Figures

CONTROL SYSTEM FOR A SULFUR PROCESS

This invention relates to the production of free sulfur from hydrogen sulfide ($H_2S$). In one specific aspect the invention relates to a method and apparatus for obtaining near optimum performance of a sulfur plant where free sulfur is produced from hydrogen sulfide. In a second specific aspect, this invention relates to a method and apparatus for reducing air pollution produced by the production of free sulfur from hydrogen sulfide. In a third specific aspect, the invention relates to a method and apparatus for controlling the ratio of hydrogen sulfide to oxygen fed to a reaction of hydrogen sulfide and oxygen to form free sulfur. In a fourth specific aspect, the invention relates to a method and apparatus for maintaining a desired hydrogen sulfide to sulfur dioxide ($SO_2$) ratio to a catalytic sulfur removal reactor. In a fifth specific aspect, the invention relates to a method and apparatus for maintaining a desired hydrogen sulfide to sulfur dioxide ratio to a sulfur plant tail gas cleanup process.

The recovery of free sulfur from gaseous streams containing hydrogen sulfide has become a valuable procedure in the petroleum gas industries. Such an operation results in both the recovery of valuable free sulfur and a reduction of atmospheric pollution. The free sulfur generally is produced by a process which involves the following two reactions:

The first reaction generally takes place in the combustion chamber of a boiler. Since this reaction is highly exothermic, the substantial amount of heat which is liberated is recovered in the form of steam production. One third of the source hydrogen sulfide is combined with air to form sulfur dioxide in this reaction. The reaction of the hydrogen sulfide is combined with the reaction products from the combustion chamber to carry out the second reaction in the furnace. The effluent from the furnace is cooled, and the free sulfur product is recovered as a liquid.

All the hydrogen sulfide and sulfur dioxide gases will not be converted in the furnace. The remaining unconverted gases are passed through a catalytic sulfur removal reactor to further convert the unreacted hydrogen sulfide and sulfur dioxide to free sulfur. The effluent from the reactor is cooled, and the free sulfur product is removed as a liquid.

In the past, the noncondensed material from the catalytic sulfur removal reactor was simply passed to as incinerator. However, air pollution considerations make such a procedure undesirable. Various processes have been developed to clean up the tail gas from the catalytic sulfur removal reactor, resulting in less air pollution and in additional free sulfur recovery.

When a tail gas cleanup process is utilized, close control of the desired ratios between the gases to be reacted must be maintained. It is also desirable to be able to change the ratio of the hydrogen sulfide and the sulfur dioxide in the tail gas from the catalytic sulfur removal reactors to conserve the catalyst in the tail gas cleanup process. This control is made difficult by the large extent of variations in the composition of the hydrogen sulfide containing gas which comprises the feed to the sulfur producing operation. Previous control methods have been largely ineffective in obtaining the close control that is required to optimize the performance of both the sulfur plant and the tail gas cleanup process.

Accordingly, it is an object of this invention to provide a method and apparatus for controlling the production of free sulfur from hydrogen sulfide. A second object of this invention is to provide a method and apparatus for obtaining near optimum performance of a sulfur plant where free sulfur is produced from hydrogen sulfide. A third object of this invention is to provide a method and apparatus for reducing air pollution produced by the manufacture of free sulfur from hydrogen sulfide. A fourth object of this invention is to provide a method and apparatus for controlling the ratio of hydrogen sulfide to oxygen fed to a reaction of hydrogen sulfide and oxygen to form free sulfur. A fifth object of this invention is to provide a method and apparatus for maintaining a desired hydrogen sulfide to sulfur dioxide ratio to a catalytic sulfur removal reactor. A sixth object of this invention is to provide a method and apparatus for maintaining a desired hydrogen sulfide to sulfur dioxide ratio to a sulfur plant tail gas cleanup process.

In accordance with the present invention, an improved method and apparatus for controlling the production of free sulfur from hydrogen sulfide is provided wherein a computer control system is utilized to obtain near optimum performance from a sulfur plant by maintaining the $H_2S/SO_2$ ratios to the catalytic sulfur removal reactors and to the tail gas cleanup process at desired values. The desired $H_2S/SO_2$ ratio to the catalytic sulfur removal reactors is maintaned at a desired value by controlling the air flow to the furnace in such a manner that enough $H_2S$ in the acid gas feed is converted to $SO_2$ to give the desired $H_2/SO_2$ ratio in the gas stream flowing from the furnace to the catalytic sulfur removal reactors. The desired $H_2S/SO_2$ ratio to the tail gas cleanup process is maintained at a desired value by utilizing an $H_2S$ bypass stream to provide additional $H_2S$ from the acid gas feed stream to the tail gas. The flow rate of the $H_2S$ bypass stream is manipulated to maintain a desired $H_2S/SO_2$ ratio to the tail gas cleanup process. A combination of feed forward and feedback control is used to manipulate the flow rate of the air to the furnace and the flow rate of the $H_2S$ bypass stream.

Additional objects and advantages of the invention will be apparent from the following description of a preferred embodiment of the invention as illustrated by the drawings in which.

For the sake of simplicity, the invention is illustrated and described in terms of a sulfur plant wherein the catalytic sulfur converters are Claus converters and the tail gas cleanup process is the IFP process developed by the Institut Francais du Petrole, a description of which may be found in the May, 1971 issue of Hydrocarbon Processing at pages 89-91.

Although the invention is illustrated and described in terms of a specific embodiment, the applicability of the use of the invention described herein extends to sulfur plants using different types of catalytic sulfur converters and/or tail gas cleanup processes.

Controllers shown may utilize the various modes of control such as proportional, proportional-integral, proportional-derivative, or proportional-integral-derivative. In a preferred embodiment proportional-integral controllers are utilized. The operation of these types of controllers are well known in the art. The output control signal of a proportional-integral controller may be represented as $$S = K_1 E + K_2 \int E\, dt$$

where
$S$ = output control signal;
$E$ = difference between two input signals; and
$K_1$ and $K_2$ = constants.

Figure 1:
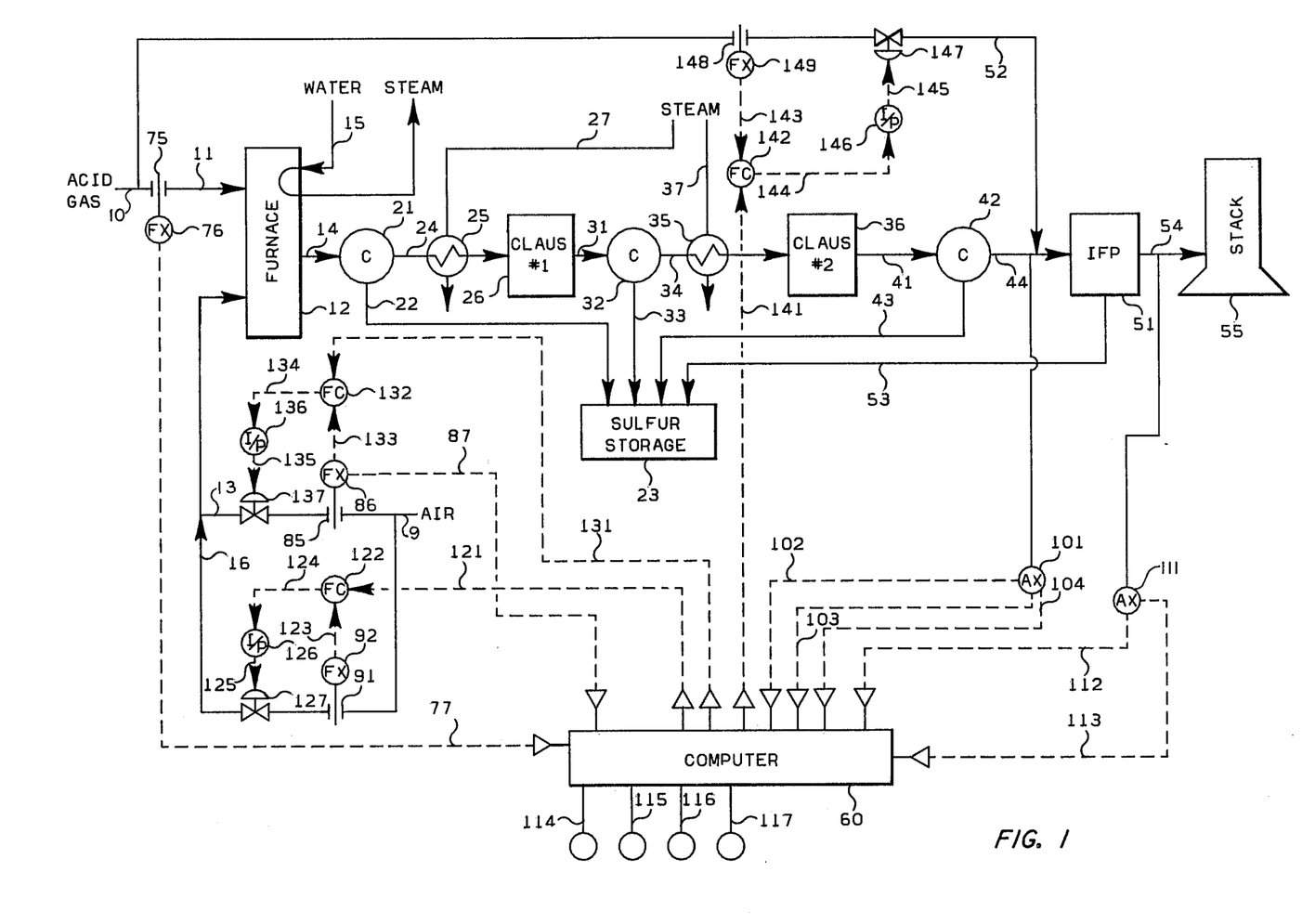
FIG. 1 is an illustration of a Claus -IFP sulfur plant with associated controls.

Referring now to the drawings and in particular to FIG. 1, an acid-gas feed stream containing $H_2S$ passes from supply conduit means 10 through conduit means 11 into the reaction furnace 12. The reaction furnace 12 is also supplied with air from supply conduit means 9 through primary air supply conduit means 13 and trim air conduit means 16. Sufficient air is mixed with the acid-gas feed in the furnace to convert one-third of the $H_2S$ fed to the furnace to $SO_2$ and also burn any hydrocarbons present in the acid-gas feed. The well-known stoichiometric reaction in the furnace is (1) $2 H_2S + 3 O_2 \rightleftarrows 2 H_2O + 2 SO_2$.

(2) $2 H_2S + SO_2 \rightleftarrows 3S + 2 H_2O$.

Burning of one-third of the $H_2S$ to $SO_2$ yields a desired $H_2S/SO_2$ mol ratio of 2.0 in the reaction effluent gas which leaves the reaction furnace 12 via conduit means 14.

The flame temperature in the reaction furnace may reach temperatures of 2450° F. At such temperature some of the unburned $H_2S$ can react with the $SO_2$ formed by the reaction given in equation (1), to form free sulfur vapor in accordance with the reaction of equation (2). This will decrease the temperature of the hot gases to about 2300° F. Heat can be removed from the hot gases by heat exchange with water passed through the reaction furnace 12 via conduit means 15. The hot gases in the reaction furnace are typically cooled to 550° F before exiting the furnace.

The hot gases pass from the reaction furnace 12 through conduit means 14 to a sulfur condenser 21. The free sulfur vapor formed in the reaction furnace 12 is condensed and the resulting liquid sulfur can then be separated from the main gas stream containing unreacted $H_2S$ and $SO_2$. The separated liquid free sulfur flows through conduit means 22 to sulfur storage tank 23.

The main gas stream from the sulfur condenser 21 must be reheated before going to a sulfur converter reactor. This is necessary to prevent sulfur condensation and subsequent catalyst fouling on the converter catalyst beds. The main gas stream flows through heat exchanger means 25 via conduit means 24 to a Claus catalytic converter 26. The main gas stream is heated to a desired temperature, e.g., in the range of 400°–450° F, by the high pressure steam flowing through conduit means 27.

The claus reaction proceeds to a further degree of completion in the presence of the Claus catalyst in the Claus catalytic converter 26. The reaction involved is (2) $2 H_2S + SO_2 \rightleftarrows 3S + 2 H_2S$.

The main gas stream which now contains free sulfur plus the unreacted $H_2S$ and $SO_2$ flows out of the Claus catalytic converter 26 through conduit means 31 to sulfur condenser 32 where the free sulfur is condensed. The condensed free sulfur flows through conduit means 33 to sulfur storage tank 23.

The thus stripped main gas stream, containing the remaining unreacted $H_2S$ and $SO_2$, is fed through heat exchanger means 35 via conduit means 34 to Claus catalytic converter 36. The unreacted $H_2S$ and $SO_2$ gases are again heated to a desired temperature, e.g., in the range of 400–450° F, by high pressure steam which flows through conduit means 37.

More free sulfur is formed from the previously unreacted $H_2S$ and $SO_2$ in the Claus catalytic converter 36. The effluent stream containing free sulfur and the remaining unreacted $H_2S$ and $SO_2$ passes from the Claus catalytic converter 36 to sulfur condenser 42 via conduit means 41. The free sulfur is condensed and flows through conduit means 43 to sulfur storage tank 23.

The Claus tail gas, containing the remaining unreacted $H_2S$ and $SO_2$ which are still in a $H_2O/SO_2$ mol ratio of about 2.0, flows through conduit means 44 to IFP converter 51. The basic reaction of the IFP process is the same as for the Claus catalytic converters:

$$2 H_2S + SO_2 \rightleftarrows 3S + 2H_2O.$$

However, the IFP reaction is conducted in a solvent which dissolves the $H_2S$, $SO_2$, and a catalyst. Solubility of free sulfur in the solvent is low, and product sulfur can be continuously separated from the reaction mixture, pushing the reaction to the right. Use of the IFP converter on the Claus tail gas results in sulfur conversions of greater than 99.3% for the overall Claus-IFP process.

It is desirable to have an $H_2S/SO_2$ mol ratio of slightly greater than 2.0 in the IFP converter 51 in order to conserve the catalyst. Additional $H_2S$ is supplied by routing part of the acid gas feed stream from conduit 10 through bypass conduit means 52 to the IFP converter 51 as an acid gas bypass stream, i.e., a stream which bypasses the Claus reactors.

The sulfur produced in the IFP converter 51 is removed through conduit means 53 to sulfur storage tank 23. Any remaining unreacted $H_2S$ and $SO_2$ can be removed from the IFP converter 51 through conduit means 54 to stack 55 where the unreacted gases are incinerated.

As has been stated, one object of this invention is to optimize the performance of a sulfur plant by maintaining the $H_2S/SO_2$ ratio to the primary sulfur removal reactors at least substantially at 2.0 while maintaining the $H_2S/SO_2$ ratio to a tail gas cleanup process at a desired ratio other than 2.0. In the preferred embodiment of the invention illustrated in FIG. 1, the primary sulfur removal reactors are Claus catalytic converters 26 and 36 and the tail gas clean-up process is an IFP converter 51. In a preferred embodiment the desired $H_2S/SO_2$ mol ratio for the total feed to the IFP converter 51 is 2.3.

The $H_2S/SO_2$ mol ratio to the Claus catalytic converters 26 and 36 can be maintained by manipulating the flow of air through conduits 13 and 16 to the furnance reactor 12. The $H_2S/SO_2$ ratio for the total feed to the IFP converter 51 can be maintained by manipulating the flow of acid gas feed through bypass conduit means 52 to the IFP converter 51.

Computer control of the process is accomplished by providing computer means 60 with measured process variables as inputs. These process variables are then utilized by computer means 60 to generate set point values which are used to maintain the various controlled flow rates at desired levels.

Flow sensor 75, located in supply conduit means 11, measures the actual flow rate of acid gas through conduit means 11 to furnace 12. Flow transducer 76, associated with flow sensor 75, transmits this information to computer means 60 via data signal 77. Flow sensor 85, located in the primary air supply conduit means 13, measures the actual flow rate of air through conduit means 13. Flow transducer 86, associated with flow sensor 85, transmits this information to computer means 60 via data signal 87. Flow sensor 91, located in trim air conduit means 16, measures the actual flow rate of the trim air. Flow transducer 92, associated with flow sensor 91, transmits this information to flow controller 122 via data signal 123.

An analyzer 101, such as a gas chromatograph, analyzes the Claus tail gas flowing from the third sulfur condenser 42 through conduit means 44 to the IFP reactor 51. Analyzer 101 provides the computer means 60 with three data signals. Data signal 102 is representative of the $H_2S$ concentration in the Claus tail gas flowing into the IFP converter 51. Data signal 103 is representative of the $SO_2$ concentration in the Claus tail gas flowing into the IFP converter 51. Data signal 104 is representative of the $H_2S/SO_2$ ratio in the Claus tail gas flowing into the IFP converter 51.

An analyzer 111, such as a gas chromatograph, analyzes the IFP tail gas stream flowing from the IFP converter via conduit means 54. Analyzer 111 provides the computer means 60 with two signals. Data signal 112 is representative of the $H_2S$ concentration in the tail gas from the IFP converter. Data-ready signal 113 initiates an updating process by computer means 60. Because of the low concentration of $H_2S$ in the tail gas from the IFP converter, a sensitive chromatographic analyzer such as the Optichrom ® 2100 Process Chromatograph System with a flame photometric detector, manufactured by Applied Automation, Inc., Bartlesville, Ok. is utilized as analyzer 111.

Computer means 60 is also supplied with certain setpoint values. Signal 114 is representative of the required $H_2S/SO_2$ ratio in the tail gas stream from Claus catalytic converter 36 and has a value of 2.0 in this preferred embodiment. Signal 115 is representative of the nominal volume of air necessary to convert one-third of the $H_2S$ in a known volume of the acid gas feed to $SO_2$. Signal 115 varies with factors such as water vapor content in the air, concentration of $H_2S$ in the acid gas feed stream, or hydrocarbon concentration in the acid gas feed stream. Signal 116 is representative of the required $H_2S$ concentration in the tail gas from the IFP converter 51 necessary to meet air pollution requirements. Signal 117 is representative of the desired steady state flow rate of the trim air flow through conduit means 16. The trim air flow is generally kept in the mid-range position to allow a quick response in either direction to any process changes.

Based on the described input data, computer means 60 calculates the required flow rate of the trim air, and the required flow rate of the acid gas bypass stream. Signal 121, representative of the required flow rate of the trim air, is supplied to the setpoint input of flow controller 122. Flow controller 122 is also supplied with measurement signal 123, representative of the actual flow rate of the trim air from flow transducer 92. Signal 124 representative of the comparison of signals 121 and 123 by flow controller 122, can be transformed from an electrical signal to a pneumatic signal 125 by current to pneumatic transducer 126. Control valve 127 is manipulated in response to signal 125 to provide the desired trim air flow rate.

Signal 131, representative of the required flow rate of the main air, is supplied to the setpoint input of flow controller 132. Flow controller 132 is also supplied with measurement signal 133, representative of the actual flow rate of the main air, from flow transducer 86. Signal 134, representative of the comparison of signals 131 and 133 by flow controller 132, can be transformed from an electrical signal to a pneumatic signal 135 by current to pneumatic transducer 136. Control valve 137 is manipulated in response to signal 135 to provide the desired main air flow rate.

Signal 141, representative of the required flow rate of the acid gas bypass stream, is supplied to the setpoint input of flow controller 142. Flow controller 142 is also supplied with measurement signal 143, representative of the actual flow rate of the acid gas bypass stream from flow transducer 149 associated with flow sensor 148 located in conduit means 52. Signal 144, representative of the comparison of signals 141 and 143 by flow controller 142, can be transformed from an electrical signal to a pneumatic signal 145 by current to pneumatic transducer 146. Control valve 147 is manipulated in response to signal 145 to provide the desired acid gas bypass stream flow rate.

Figure 2:
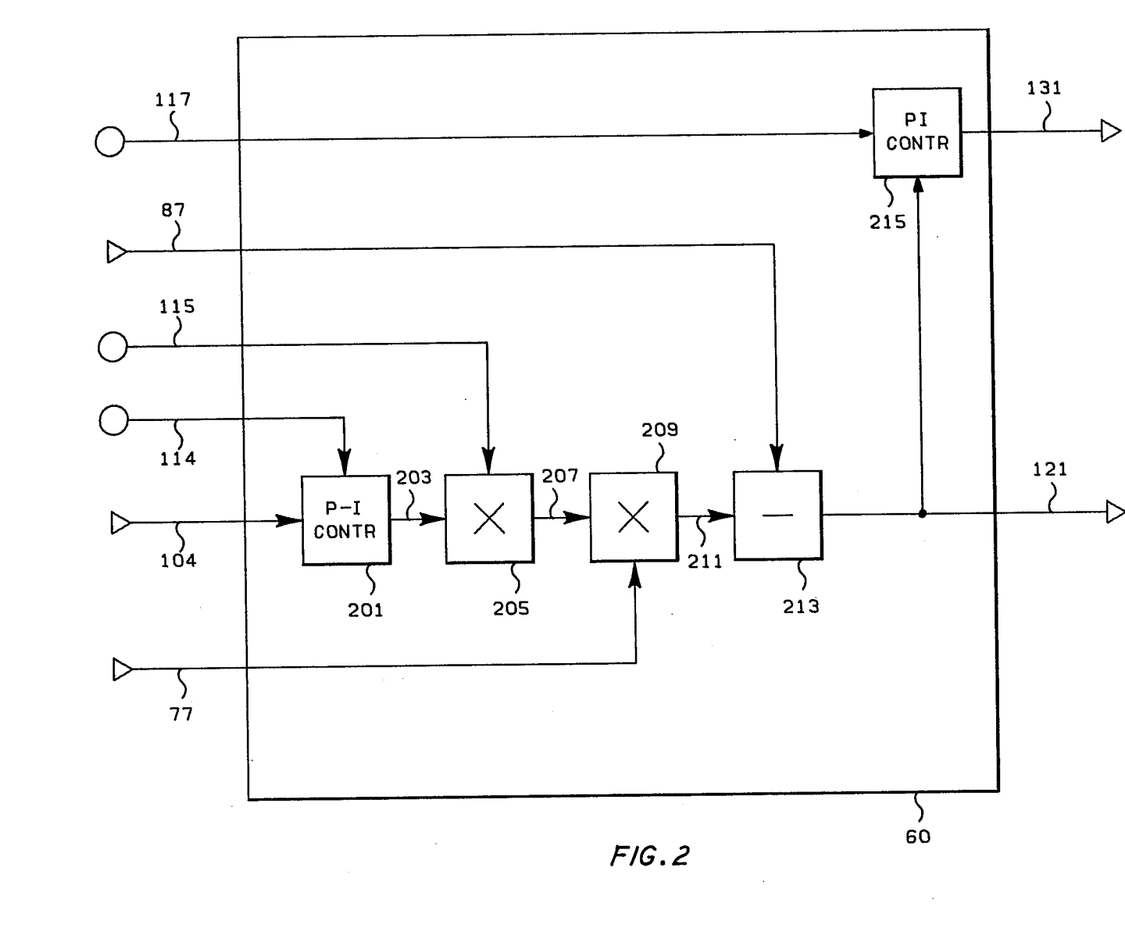
FIG. 2 is a schematic of a computer means for the calculation of the main air and trim air flow rate setpoints.

FIG. 2 illustrates a simplified method for utilizing an analog computer to calculate the required flow rate of the trim air and the main air. The method and apparatus shown in FIG. 2 is only one of many such configurations which could be utilized to perform the required calculations. It should also be recognized that a digital computer could easily be programmed to perform the required calculations. Signal 104, representative of the actual $H_2S/SO_2$ ratio in the tail gas of the Claus catalytic converter 36, is provided to controller 201. Controller 201 is also provided with set point signal 114, representative of the required $H_2S/SO_2$ ratio in the tail gas of the Claus catalytic converter 36. In a preferred embodiment, controller 201 is a proportional-integral controller. The output signal 203 of such a controller is well known in the art, as has been previously stated. Signal 203 is supplied to multiplying means 205. Multiplying means 205 is also supplied with set point signal 115 representative of the nominal volume of air necessary to convert one-third of the $H_2S$ in a known volume of acid gas to $SO_2$. Signal 203 is multiplied by signal 115 to produce signal 207. Signal 207 is representative of the required volume of air necessary to bring the $H_2S/SO_2$ ratio in the tail gas of the second Claus catalytic converter 36 to 2.0 for a known volume of acid gas.

Signal 207 is supplied to multplying means 209. Multiplying means 209 is also supplied with signal 77 representative of the actual acid gas flow rate to the furnace 12 through conduit means 11. Signal 207 is multiplied by signal 77 to produce signal 211 representative of the total required air flow rate necessary to bring the H$_2$S/SO$_2$ ratio in the tail gas of the second Claus catalytic converter 36 to 2.0. Signal 211 is supplied to subtracting means 213. Subtracting means 213 is also supplied with signal 87 representative of the actual main air flow rate. Signal 87 is subtracted from signal 211 to produce signal 121 representative of the required flow rate of the trim air.

It is desirable to keep the trim air flow rate substantially at some acceptable steady state condition so that it will be in a position to respond in either direction to any process changes. To accomplish this, signal 121 is also supplied to controller 215, which is a preferred embodiment is a proportoional-integral controller. Controller 215 is also supplied with signal 117, representative of the desired steady state condition of the trim air flow. As has been previously stated, controller 215 acts on signals 117 and 121 to produce signal 131 representative of the required main air flow rate. This system allows the faster and more sensitive trim air adjustment to prevail over the shorter term with the main air controls prevailing over the longer term.

Figure 3:
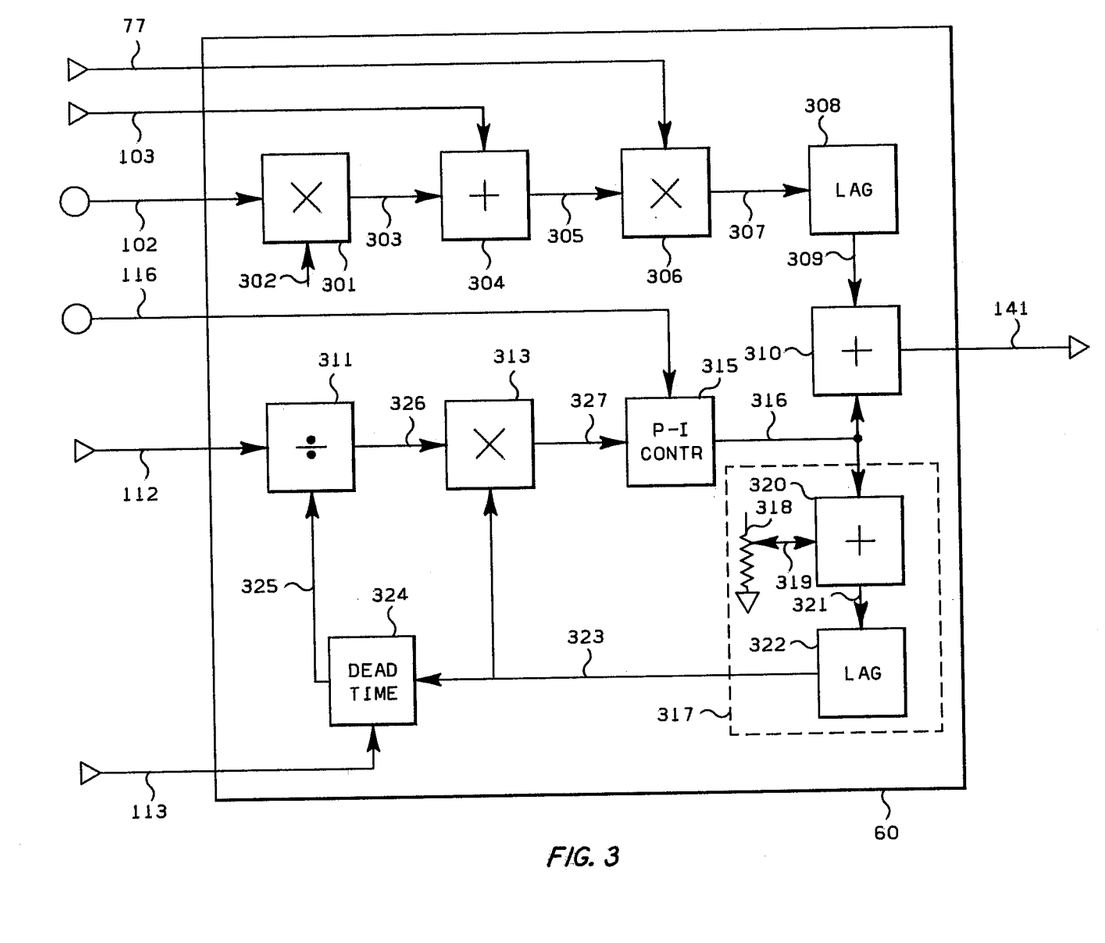
FIG. 3 is a schematic of a computer means for the calculation of the acid gas bypass flow rate set point.

FIG. 3 illustrates a simplified method for utilizing an analog computer to calculate the required flow rate of the acid gas bypass stream. Again, the method and apparatus shown in FIG. 3 is only one of many such configurations which could be utilized to perform the required calculations. Also a digital computer could easily be programmed to perform the required calculations. The flow rate of the acid gas bypass stream is manipulated responsive to the combined effects of feedback control of the H$_2$S concentration in the tail gas of the IFP converter and a feed forward control of the acid gas bypass stream flow rate with correction for variation in the H$_2$S/SO$_2$ ratio in the tail gas from the second CLaus catalytic converter 36.

A feed forward signal to control the H$_2$S/SO$_2$ mol ratio in the tail gas from the second Claus catalytic converter 36 at 2.0 is implemented by supplying data signal 102, representative of the H$_2$S concentration in the Claus tail gas flowing from Claus catalytic converter 36 to multiplying means 301. Multiplying means 301 is also supplied with signal 302 representative of the value −0.5. Signal 102 is multiplied by signal 302 to produce signal 303. Signal 303 is supplied to summing means 304. Summing means 304 is also supplied with signal 103 representative of the concentration of SO$_2$ in the Claus tail gas flowing into the IFP converter 51. Signal 303 is added to signal 103 to produce signal 305 representative of any difference between the SO$_2$ conentration and half the H$_2$S concentration.

Signal 305 is supplied to muliplying means 306. Multiplying means 306 is also supplied with signal 77 representative of the actual acid gas flow rate to the furnace 12 through conduit means 11. Signal 305 is multiplied by signal 77 to produce signal 307 representative of the acid gas bypass stream flow rate feed forward control signal. Signal 307 is acted on by lag means 308 to produce signal 309 which is supplied to summing means 310.

Signal 112 is representative of the H$_2$S concentration in the tail gas of the IFP converter 51. On the first computation cycle, signal 112 will be supplied through dividing means 31 and multiplying means 313 to controller 315. Controller 315 is a proportional-integral controller in a preferred embodiment. Controller 315 is also supplied with set point signal 116 representative of the desired H$_2$S concentration in the tail gas from the IFP converter 51. Controller 315 acts on signals 112 and 116 in the same manner as previously described and supplies signal 316 representative of the H$_2$S concentration control signal to summing means 310.

Signal 316 is representative of what the state of the process was T time earlier because there is a true dead time in the process. Even at the instant the process information is made available, it is only history, not a true indication of the state of the process at that instant. To remedy this situation, an electrical analog process model reflecting all the process elements and their effects is used. This model is shown inside the dotted lines of FIG. 3 and is labeled model 317. This model reflects the effects of control valves and measurement instrumentation but does not include the process dead time. Therefore, if the model is accurate, for a given controller 315 output signal 316, the output signal 323 of the model 317 will be an instantaneous indication of the process at a time T$_1$.

The model 317 is made adjustable so that it can be tuned to reflect the real process as accurately as possible. Biasing means 318 may be utilized to introduce an adjustable bias to the model. Signal 319 from biasing means 318 is utilized to act on signal 316 in summing means 320 to produce signal 321. Signal 321 is lagged by lag means 322 to produce signal 323. Provision is made for adjusting the time constant of lag means 322 which is preferably a second order lag means.

Even with the model 317 tuned as well as possible, there will still be some error because the model is but an approximation of the real process. To compensate for this last error, the modeled process signal 323 is operated on by a true dead time circuit 324. The actual dead time of circuit 324 is adjustable and is set as close as possible to the real process dead time T$_2$. The dead time circuit 324 is also designed to include a sample and hold circuit. The input to the dead time circuit 324 is a continuous analog signal 323 and the output signal 325 of the dead time circuit 324 is a held sample signal of signal 323 delayed by the dead time T$_2$. The sample signal 325 is held until command signal 113 is made to the dead time circuit 324 updating its output signal 325. Signal 325 is supplied to dividing means 311. Both signal 112 and signal 325 represent past history. Signal 112 represents the real process T$_2$ time ago and signal 311 represents the modeled process T$_2$ time ago. Signal 112 and signal 325 are compared by dividing signal 112 by signal 325. If all is perfect, these signals will be the same and this ratio will be 1.0. If, however, there was some error in the process model, this ratio of signals will be greater than or less than 1.0.

If signal 326, representative of the ratio of signal 112 to signal 325, is then multiplied by signal 323 by multiplying means 313, any errors in the not delayed modeled process signal 323 will be corrected and signal 327 will be an accurate representation of the concentration of H$_2$S in the IFP converter 51 tail gas at the present instant of time T$_1$. Signal 327 and signal 116 are then acted on by controller 315 to provide an updated control signal 316 which is supplied to summing means 310. Summing means 310 sums signal 309 and signal 316 to produce signal 141 representative of the required flow rate of the acid gas bypass stream.

The invention has been described in terms of a presently preferred embodiment as shown in FIG. 1. Specific components which can be used in the practice of the invention as shown in FIG. 1 are as follows:

| | |
|---|---|
| Analyzer 101 and 111 | Optichrom ®2100 Process Chromatograph System, Applied Automation, Inc. Bartlesville, Oklahoma |
| Computer means 60 | Optrol ®A-402 Applied Automation, Inc. Bartlesville, Oklahoma |

Flow sensors 75, 85, 91 and 148 and associated transducers 76, 86, 92 and 149; flow controllers 122, 132, and 142; control valves 127, 137 and 147; and current to pressure transducers 126, 136, and 146 are each well known, commercially available control components such as are described at length in Perry's *Chemical Engineer's Handbook*, 4th Edition, Chapter 22, McGraw-Hill.

The specific components shown in FIGS. 2 and 3 are well known components in the art of analog computers. These components are supplied as cards in the Optrol ® A-402 computer manufactured by Applied Automation, Inc. Bartlesville, Okla.

While the invention has been described in terms of the presently preferred embodiment, reasonable variations and modifications are possible, by those skilled in the art, within the scope of the described invention and the appended claims.

That which is claimed is:

1. Apparatus comprising:
   a furnace means;
   first conduit means for passing a first feed stream containing hydrogen sulfide ($H_2S$) into said furnace means;
   second conduit means for passing a second feed stream containing oxygen into said furnace means to convert part of the $H_2S$ contained in the first feed stream to sulfur dioxide ($SO_2$);
   third conduit means for withdrawing the resulting gaseous reaction mixture, containing free sulfur and unreacted $H_2S$ and $SO_2$ gases, from said furnace means;
   first sulfur removal means to remove at least a part of the free sulfur contained in the said gaseous reaction mixture, thereby producing a denuded gaseous stream containing unreacted $H_2S$ and $SO_2$;
   a catalytic sulfur converter means to convert a portion of the unreacted $H_2S$ and $SO_2$ gases contained in said denuded gaseous mixture to free sulfur;
   second sulfur removal means to remove at least a portion of the free sulfur from the resulting gaseous reaction mixture produced in said catalytic sulfur converter means, thereby producing a primary tail gas stream containing unreacted $H_2S$ and $SO_2$;
   a tail gas cleanup reactor means for further reducing the concentration of $H_2S$ and $SO_2$ in the primary tail gas stream from said catalytic sulfur converter means;
   fourth conduit means for passing a third feed stream containing $H_2S$ gas into said tail gas cleanup reactor means;
   means for separating at least part of the free sulfur formed in said tail gas cleanup reactor means from the resulting reaction effluent to produce a secondary tail gas stream;
   means for establishing a first signal representative of the actual flow rate of the first feed stream flowing through said first conduit means;
   means for establishing a second signal representative of the actual flow rate of the second feed stream flowing through said second conduit means;
   means for analyzing said primary tail gas stream flowing from said second sulfur removal means to said tail gas cleanup reactor means and establishing a third signal representative of the $H_2S$ concentration in said primary tail gas stream, a fourth signal representative of the $SO_2$ concentration in said primary tail gas stream, and a fifth signal representative of the $H_2S/SO_2$ ratio in said primary tail gas stream;
   means for analyzing said secondary tail gas stream and establishing a sixth signal representative of the $H_2S$ concentration in said secondary tail gas stream and a seventh signal representative of a data ready condition;
   means for establishing an eighth signal representative of the desired $H_2S/SO_2$ ratio in said primary tail gas stream;
   means for establishing a ninth signal representative of the required volume of said second feed stream necessary to convert a required proportion of the $H_2S$ in a known volume of said first feed stream to $SO_2$.
   means for establishing a 10th signal representative of the desired $H_2S$ concentration in said secondary tail gas stream;
   means for producing an 11th signal representative of the required flow rate of said second feed stream and for utilizing said 11th signal to manipulate the flow rate of said second feed stream;
   means for producing a 12th signal representative of a feed forward control signal for the $H_2S/SO_2$ ratio in said primary tail gas stream;
   means for producing a 13th signal representative of a feedback control signal for the $H_2S$ concentration in said secondary tail gas stream; and
   means for producing a 14th signal representative of the required flow rate of the third feed stream and for utilizing said 14th signal to manipulate the flow rate of said third feed stream.

2. Apparatus in accordance with claim 1 wherein said means for establishing said third through seventh signals is a chromatographic analyzer means.

3. Apparatus in accordance with claim 1 wherein said means for producing said 11th signal and for utilizing said 11th signal to manipulate the flow rate of said second feed stream comprises:
   means for comparing said fifth signal and said eighth signal and for producing a 15th signal representative of the comparison;
   means for multiplying said 15th signal by said ninth signal to produce a 16th signal representative of the required volume of said second feed stream necessary to bring the $H_2S/SO_2$ ratio in said primary tail gas stream to a desired ratio for a known volume of said first feed stream;
   means for multiplying said 16th signal by said first signal to produce said 11th signal representative of the required flow rate of said second feed stream necessary to bring the $H_2S/SO_2$ ratio in said primary tail gas stream to a desired ratio;
   means for comparing said 11th signal and the second signal and for producing a 17th signal representative of the comparison; and
   means for manipulating the flow rate of said second feed stream in response to said 17th signal.

4. Apparatus in accordance with claim 3 wherein said means for comparing said fifth signal and said eighth signal and said means for comparing said 11th signal and said second signal is a proportional-integral controller.

5. Apparatus in accordance with claim 1 wherein said means for producing said 12th signal comprises:
- means for multiplying said third signal by a factor of −0.5 to produce a 15th signal;
- means for summing said fourth signal and said 15th signal to produce a 16th signal reprsentative of the difference between the $SO_2$ concentration and half the $H_2S$ concentration in said primary tail gas stream;
- means for multiplying said 16th signal by said first signal to produce a 17th signal representative of the control signal for the flow rate of said first feed stream; and
- means for lagging said 17th signal to produce said 12th signal.

6. Apparatus in accordance with claim 1 wherein said means for producing said 13th signal comprises:
- means for comparing said sixth signal and said 10th signal and for producing said 13th signal representative of the comparison;
- means for processing said 13th signal to account for the effects of control valves and measurement instrumentation on said sixth signal and to produce a 15th signal representative of the instantaneous value of a model of said sixth signal at a time $T_1$;
- means for introducing a dead time $T_2$, representative of the real process dead time, into said 15signal to produce a 16th signal representative of said 15th signal delayed by a time $T_2$;
- means for sampling said 16th signal and for holding the sampled data until said seventh signal enables said means for holding the sampled data to transmit a 17th signal replacement of said sampled data;
- means for dividing said sixth signal by said 17th signal to produce an 18th signal representative of the ratio;
- means for multplying said 18th signal by said 16th signal to produce a 19signal representative of the concentration of $H_2S$ in said secondary tail gas stream reactor at the present instant of time $T_1$; and
- means for comparing said 10th signal and said 19th signal and for producing an updated said 13th signal representative of the comparison.

7. Apparatus in accordance with claim 6 wherein said means for processing said 13th signal to produce a 15th signal comprises:
- a biasing means used to tune said 13th signal to reflect the real process as accurately as possible and produce a 20th signal in response thereto; and
- a leg means having an adjustable time constant to act on said 20th signal and produce said 15th signal.

8. Apparatus in accordance with claim 6 wherein said means for comparing said sixth signal and said 10th signal and said means for comparing said 10th signal and said 19th signal is a proportional-integral controller.

9. Apparatus in accordance with claim 1 wherein said means for producing said 14th signal and for utilizing said 14th signal to manipulate the flow rate of said third feed stream comprises:
- means for summing said 12th signal and said 13th signal to produce said 17th signal;
- means for establishing a 14th signal representative of the actual flow rate of said third feed stream;
- means for comparing said 14th signal and said 15th signal and for producing a 16th signal representative of the comparison; and
- means for manipulating the flow rate of said third feed stream in response to said 16th signal.

10. Apparatus in accordance with claim 9 wherein said means for estsblishing said first, second and 14th signals is a flow sensing means and an associated transducer means.

11. Apparatus in accordance with claim 9 wherein said means for comparing said 14th signal and said 15th signal is a proportional-integral controller.

12. Apparatus in accordance with claim 1 additionally comprising:
- fifth conduit means for passing a fourth feed stream containing oxygen to trim the flow of said second feed stream;
- sixth conduit means for passing water into said furnace means to cool said gaseous reaction mixture in said furnace means;
- means for supplying heat to said denuded gaseous stream;
- an incinerator means for burning said secondary tail gas stream;
- means for establishing a 15signal representative of the actual flow rate of said fourth feed stream; and
- means for establishing a 16th signal representative of the desired steady state flow rate of said fourth feed stream.

13. Apparatus in accordance with claim 12 wherein said means for producing an 11th signal representative of the required flow rate of said second feed stream and for utilizing said 11th signal to manipulate the flow rate of said second feed stream comprises:
- means for comparing said fifth signal and said eighth signal and for producing a 17th signal representative of the comparison;
- means for multiplying said 17th signal by said ninth signal to produce an 18th signal representative of the required volume of said second feed stream necessary to bring the $H_2S/SO_2$ ratio in said primary tail gas stream to a desired ratio for a known volume of said first feed stream;
- means for multiplying said 18th signal by said first signal to produce a 19th signal representative of the required flow rate of said second feed stream necessary to bring the $H_2S/SO_2$ ratio in said primary tail gas stream to a desired ratio;
- means for subtracting said second signal from said 19th signal to produce a 20th signal representative of the required flow rate of said fourth feed stream;
- means for comparing said 16th signal and said 20th signal and for producing said 11th signal;
- means for comparing said 11signal and said second signal and for producing a 21st signal representative of the comparison; and
- means for manipulating the flow rate of said second feed stream in response to said 21st signal.

14. Apparatus in accordance with claim 13 additionally comprising:
- means for comparing said 20th signal and said third signal and for producing a 22nd signal representative of the comparison; and
- means for manipulatng the flow rate of said fourth feed stream in response to said 22nd signal.

15. Apparatus in accordance with claim 14 wherein said means for comparing said fifth signal and said eighth signal, said 16th signal and said 20th signal, said 11th signal and said second signal, and said 20th signal and said third signal is a proportional-integral controller.

16. Apparatus in accordance with claim 15 wherein said means for establishing a 15th signal is a flow sensing means and an associated transducer means.

17. A method for controlling the conversion of hydrogen sulfide to sulfur, comprising the steps of:

passing a first feed stream containing hydrogen sulfide ($H_2S$) into a first reaction zone;

passing a second feed stream containing oxygen into said first reaction zone;

in said first reaction zone, converting part of the hydrogen sulfide from said first stream to sulfur dioxide and then reacting part of the thus produced sulfur dioxide with part of the remaining hydrogen sulfide to produce free sulfur;

passing the resulting gaseous reaction mixture containing free sulfur and unreacted hydrogen sulfide and sulfur dioxide gases from said first reaction zone to a first sulfur removal zone and therein removing at least a portion of the free sulfur contained in the mixture, thereby producing a denuded stream containing unreacted hydrogen sulfide and sulfur dioxide;

passing said denuded stream to a catalytic sulfur converter zone and therein converting a portion of the unreacted hydrogen sulfide and sulfur dioxide gases to free sulfur;

passing the resulting gaseous effluent from said catalytic sulfur converter zone to a second sulfur removal zone and therein removing at least a portion of the free sulfur contained in the gaseous effluent to produce a primary tail gas stream containing unreacted hydrogen sulfide and sulfur dioxide;

passing said primary tail gas stream from said second sulfur removal zone to a tail gas cleanup reaction zone;

passing a third feed stream containing hydrogen sulfide gas into said tail gas cleanup reaction zone and therein reacting said primary tail gas stream and said third feed stream;

separating the resulting free sulfur produced in said tail gas cleanup reaction zone to produce a secondary tail gas stream containing the remaining unreacted hydrogen sulfide and sulfur dioxide gases;

establishing a first signal representative of the actual flow rate of said first feed stream;

establishing a second signal representative of the actual flow rate of said second feed stream;

establishing a third signal representative of the hydrogen sulfide concentration in the gas mixture flowing from said second sulfur removal zone, a fourth signal representative of the sulfur dioxide concentration in the gas mixture flowing from said second sulfur removal zone, and a fifth signal representative of the $H_2S/SO_2$ ratio in the gas mixture flowing from said second sulfur removal zone;

establishing sixth signal representative of the hydrogen sulfide concentration in said secondary tail gas steam and a seventh signal representative of a data ready signal;

establishing an eighth signal representative of the required $H_2S/SO_2$ ratio in said primary tail gas stream;

establishing a ninth signal representative of the required volume of said second feed stream necessary to convert a required proportion of the hydrogen sulfide in a known volume of said first feed stream to sulfur dioxide;

establishing a 10th signal representative of the desired hydrogen sulfide concentration in said secondary tail gas stream;

producing an 11th signal representative of the required flow rate of said second feed stream and utilizing said 11th signal to manipulate the flow rate of the said second feed stream;

producing a 12th signal representative of a feed forward control signal for the $H_2S/SO_2$ ratio in said primary tail gas stream;

producing a 13th signal representative of a feedback control signal for the hydrogen sulfide concentration in said secondary tail gas stream; and producing a 14th signal representative of the required flow rate of said third feed stream and utilizing said 14th signal to manipulate the flow rate of said third feed stream.

18. A method in accordance with claim 17 wherein said steps of producing said 11th signal and utilizing said 11th signal to manipulate the flow rate of said second feed stream comprises:

comparing said sixth signal and said ninth signal and producing a 15th signal representative of the comparison;

multiplying said 15th signal by said ninth signal to produce a 16th signal representative of the required volume of said second feed stream necessary to bring the $H_2S/SO_2$ ratio in said primary tail gas stream to a desired ratio for a known volume of said first feed stream;

multiplying said 16th signal by said first signal to produce said 11th signal representative of the required flow rate of said second feed stream necessary to bring the $H_2S/SO_2$ ratio in said primary tail gas stream to a desired ratio;

comparing said 11th signal and said second signal and producing a 17th signal representative of the comparison; and manipulating the flow rate of said second feed stream in response to said 17th signal.

19. A method in accordance with claim 17 wherein said step of producing said 12th signal comprises:

multiplying said third signal by factor of $-0.5$ to produce a 15th signal;

summing said fourth signal and said 15th signal to produce a 16th signal representative of the difference between the sulfur dioxide concentration and half the hydrogen sulfide concentration in said primary tail gas stream;

multiplying said 16th signal by said first signal to produce a 17th signal representative of the control signal for the flow rate of said first feed stream; and lagging said 17th signal to produce said 12th signal.

20. A method in accordance with claim 17 wherein said step of producing said 13th signal comprises:

comparing said sixth signal and said 10th signal and producing said 13th signal representative of the comparison;

processing said 13th signal to account for the effects of control valves and measurement instrumentation on said sixth signal and producing a 15th signal representative of the instantaneous value of a model of said sixth signal at a time $T_1$;

introducing a dead time $T_2$, representative of the real process dead time, into said 15th signal to produce a 16th signal representative of said 15th signal delayed by a time $T_2$;

sampling said 16th signal and holding the sampled data until said seventh signal enables said means for holding the sampled date to transmit a 17th signal representative of said sampled data;

dividing said sixth signal by said 17th signal to produce an eighteenth signal representative of the ratio;

multiplying said 18th signal by said 16th signal to produce a 19th signal representative of the concentration of hydrogen sulfide in said secondary tail gas stream at the present instant of time $T_1$; and comparing said 10th signal and said 19th signal and producing an updated said 13th signal representative of the comparison.

21. A method in accordance with claim 20 wherein said step of processing said 13th signal to produce said 15th signal comprises:

utilizing a biasing means to tune said 13th signal to reflect the real process as accurately as possible and produce a 20th signal in response thereto; and utilizing a lag means having an adjustable time constant to act on said 20th signal and produce said 15th signal.

22. A method in accordance with claim 17 wherein said steps of producing said 14th signal and utilizing said 14th signal to manipulate the flow rate of said third feed stream comprises:

summing said 12th signal and said 13th signal to produce said 14th signal;

establishing a 15th signal representative of the actual flow rate of said third feed stream;

comparing said 14th signal and said 15th signal and producing a 16th signal representative of the comparison; and manipulating the flow rate of said third feed stream in response to said 16th signal.

23. A method in accordance with claim 17 additionally comprising the steps of:

passing a fourth feed stream containing oxygen to trim the flow of said second feed stream;

passing water into said first reaction zone to cool the gaseous reaction mixture in said first reaction zone;

supplying heat to said denuded gaseous stream;

burning said secondary tail gas stream;

establishing a 15th signal representative of the actual flow rate of said fourth feed stream; and establishing a 16th signal representative of the desired steady state flow rate of said fourth feed stream.

24. A method in accordance with claim 23 wherein said steps of producing said 11th signal and utilizing said eleventh signal to manipulate the flow rate of said second feed stream comprises:

comparing said fifth signal and said eighth signal and producing a seventeenth signal representative of the comparison;

multiplying said 17th signal by said ninth signal to produce an 18th signal representative of the required volume of said second feed stream necessary to bring the $H_2S/SO_2$ ratio in said primary tail gas stream to a desired ratio for a known volume of said first feed stream;

multiplying said 18th signal by said first signal to produce a 19th signal representative of the required flow rate of said second feed stream necessary to bring the $H_2S/SO_2$ ratio in said primary tail gas stream to a desired ratio;

subtracting said second signal from said 19th signal to produce a 20th signal representative of the required flow rate of said fourth feed stream;

comparing said 16th signal and said 20th signal and producing said 11th signal;

comparing said 11th signal and said second signal and producing a 21st signal representative of the comparison; and manipulating the flow rate of said second feed stream in response to said 21st signal.

25. A method in accordance with claim 24 additionally comprising the steps of:

comparing said 20th signal and said third signal and producing a 22nd signal representative of the comparison; and manipulating the flow rate of said fourth feed stream in response to said 22nd signal.

* * * * *

UNITED STATES PATENT AND TRADEMARK OFFICE
CERTIFICATE OF CORRECTION

PATENT NO. : 4,100,266

DATED : July 11, 1978

INVENTOR(S) : Dexter E. Smith

It is certified that error appears in the above-identified patent and that said Letters Patent are hereby corrected as shown below:

Column 10, line 44, after "through", insert --- said ---; line 64, "the" should read --- said ---. Column 11, line 10, "reprsentative" should read --- representative ---; line 31, "15signal" should read --- fifteenth signal ---; line 37, "replacement" should read --- representative ---; line 42, "19signal" should read --- nineteenth signal ---; line 55, "leg" should read --- lag ---. Column 12, line 25, "15signal" should read --- fifteenth signal ---; line 54, "11signal" should read --- eleventh signal ---; line 64, "manipulatng" should read --- manipulating ---. Column 13, line 23, --- gaseous --- should be inserted before "mixture".

Signed and Sealed this

Twenty-sixth Day of June 1979

[SEAL]

Attest:

RUTH C. MASON
Attesting Officer

DONALD W. BANNER
Commissioner of Patents and Trademarks